US008055052B2

(12) United States Patent
Burns et al.

(10) Patent No.: US 8,055,052 B2
(45) Date of Patent: Nov. 8, 2011

(54) ARTIFACT SUPPRESSION IN DIAGNOSTIC IMAGES

(75) Inventors: Peter D. Burns, Fairport, NY (US); William J. Sehnert, Fairport, NY (US); Richard T. Scott, Hilton, NY (US)

(73) Assignee: Carestream Health, Inc., Rochester, NY (US)

( * ) Notice: Subject to any disclaimer, the term of this patent is extended or adjusted under 35 U.S.C. 154(b) by 486 days.

(21) Appl. No.: 12/341,276

(22) Filed: Dec. 22, 2008

(65) Prior Publication Data

US 2010/0119140 A1    May 13, 2010

Related U.S. Application Data

(60) Provisional application No. 61/114,180, filed on Nov. 13, 2008.

(51) Int. Cl.
*G06K 9/00* (2006.01)
(52) U.S. Cl. .......................................... 382/132; 382/128
(58) Field of Classification Search .................. 382/128, 382/132; 128/920, 922
See application file for complete search history.

(56) References Cited

U.S. PATENT DOCUMENTS

| 6,819,740 | B2 | 11/2004 | Takahashi et al. |
| 7,091,491 | B2 | 8/2006 | Kautzer et al. |
| 2010/0039538 | A1* | 2/2010 | Ikedo ............................ 348/241 |

OTHER PUBLICATIONS

Maolinbay et al., "Additive Noise Properties of Active Matrix Flat-Panel Imagers," Medical Physics, vol. 27, Issue 8, pp. 1841-1854, Aug. 2000.

* cited by examiner

*Primary Examiner* — David Mis

(57) ABSTRACT

A method of reducing artifacts in a digital radiographic image identifies either a row or column direction for the artifacts in the image data as a predominant direction and obtains a measurement of the image data frequency content that is subject to artifacts from the image content according to the predominant direction. The measurement of image data frequency content subject to the artifacts is tested according to a predetermined threshold. Artifacts are reduced when the predetermined threshold is exceeded by generating one or more suppression factors according to the testing results, decomposing the image content into at least two frequency bands in each row and column direction, applying the one or more suppression factors to modify at least one of the frequency bands, and recomposing the image content by recombining the at least one modified frequency band with one or more other bands into which the image had been decomposed.

15 Claims, 19 Drawing Sheets

COLUMN DIRECTION, Y

ROW DIRECTION, X

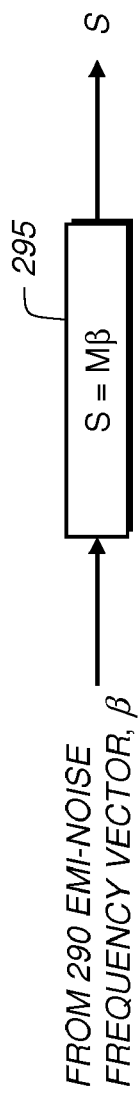

ARTIFACT SUPPRESSION IN DIAGNOSTIC IMAGES

CROSS REFERENCE TO RELATED APPLICATIONS

Reference is made to, and priority is claimed from, U.S. Ser. No. 61/114,180, filed as a provisional patent application on Nov. 13, 2008, entitled "ARTIFACT SUPPRESSION IN DIAGNOSTIC IMAGES", in the names of Burns et al., incorporated herein by reference and which is commonly assigned.

FIELD OF THE INVENTION

This invention generally relates to digital radiography (DR) imaging and more particularly relates to a method for reduction of noise patterns originating from readout circuitry for the DR sensor array.

BACKGROUND OF THE INVENTION

Digital radiography is increasingly accepted as an alternative to film-based imaging technologies that rely on photosensitive film layers to capture radiation exposure and thus to produce and store an image of a subject's internal physical features. With digital radiography, the radiation image exposures captured on radiation-sensitive layers are converted, pixel by pixel, to electronic image data which are then stored in memory circuitry for subsequent read-out and display on suitable electronic image display devices.

The perspective view of FIG. 1 shows a partial cutaway view of a small edge portion of a DR panel 30 of the indirect type. A scintillator screen 12 responds to incident x-ray radiation by generating visible light that is, in turn, detected by a flat panel detector (FPD) 32. Detector 32 has a two-dimensional array having millions of radiation sensitive pixels 24 that are arranged in a matrix of rows and columns and are connected to readout element 25. Readout element 25 is generally termed an ASIC (Application-Specific Integrated Circuit) or ASIC chip. As shown at enlarged section E, each pixel 24 has one or more photosensors 22, such as a photoresponsive diode or other light-sensitive component, and an associated switch element 26 of some type, such as one or more thin film transistors, or TFTs. To read out image information from the panel, each row of pixels 24 is selected sequentially and the corresponding pixel on each column is connected in its turn to a charge amplifier (not shown). The outputs of the charge amplifiers from each column are then applied to ASIC chips and related circuitry that generate digitized image data that then can be stored and suitably image-processed as needed for subsequent storage and display.

Each row of pixels 24 extends several hundred pixels in length. In the readout sequence, all pixels in the row are generally read at the same time. To do this, signals from each pixel in that row are simultaneously switched, in a multiplex fashion, to a set of multiple ASIC readout elements 25, each ASIC readout element 25 reading multiple pixels within that row. In one exemplary embodiment, for a DR panel with a row length of 2560 pixels, a set of 20 ASIC chips is provided for reading pixels in a row, each ASIC connecting to 128 pixels at a time.

This type of multiplexed readout sequencing arrangement has been widely adapted for digital image sensors in general and has shown itself to be practical. By grouping and sharing larger and more complex readout components so that successive rows of pixel sensors can obtain the image signal and then be read out by the same signal acquisition circuitry, this readout approach helps to optimize the usable image-forming area of FPD 32. However, this multiplexed readout arrangement is not without its problems. Component packaging densities, signal crosstalk, switching noise, so-called "white noise" from sensor circuitry, and other unwanted conditions result in some inherent level of signal noise that can interfere with image content. Noise from any of these sources can be perceptible in the final image, depending on the type of noise and on the relative sensitivity of different components to noise.

Some types of noise can be corrected for, or at least reduced in effect, using calibration or other conventional practices. Noise resulting from electromagnetic interference (EMI), however, is one type of noise that is not so easily handled and can be particularly troublesome. Artifacts that result from EMI-induced noise can occur due to electromagnetic (EM) fields generated by nearby equipment, such as power transformers and switching circuits. The EM fields that are generated by such equipment can have a field strength that varies both temporally and spatially. Not only can it be difficult to accurately predict the behavior of EM fields from neighboring equipment, which varies according to the relative placement of the DR receiver panel, but these same EM fields change with time and can affect voltage signals in the DR receiver panel during or after image exposure as well as during image data readout. EMI variations are not synchronized with the timing of electronic component operation at any point during image capture.

Artifacts from EMI-induced noise may not be perceptible along an entire row of pixels, but may affect only a portion of a row or column. Techniques that identify and compensate for row noise, therefore, may have limited value for addressing some types of EMI-related noise problems. Thus, solutions such at those presented by Maolinbay et al. in the article entitled "Additive noise properties of active matrix flat-panel imagers" in *Medical Physics*, August 2000, while they may help to minimize some types of one-dimensional image problems in DR detectors, prove disappointing for correcting two-dimensional artifacts from EMI-induced noise.

Conventional solutions for reducing EMI depend largely on the relative frequency of the EM signal. Compensation for magnetic fields can include enhanced shielding of the DR receiver panel as well as of nearby equipment and connectors. This solution can have some value for helping to reduce EMI affects. However, it can be impractical to provide sufficient shielding for other equipment outside the DR receiver panel. Moreover, shielding of the panel itself can tend to reduce its sensitivity, requiring that the patient receive higher levels of radiation as a result.

Another type of solution, as described, for example, in U.S. Pat. No. 7,091,491 entitled "Method and Means for Reducing Electromagnetic Noise Induced in X-ray Detectors" to Kautzer et al. addresses the EMI problem by detecting the interfering signal directly using a network of field sensing conductors directly integrated into the detector circuitry. This detected signal (image plus EMI noise) is then used to condition the detected image signal in an attempt to reduce the EMI induced noise. However, such a solution is fairly complex, adding to fabrication expense and complexity and makes a number of assumptions about EMI that may not be true in every environment. Other solutions include filtering signal lines and applying feedback control to power supplies. These solutions, however, are system-dependent and can be impractical for retrofit applications.

U.S. Pat. No. 6,819,740 entitled "X-ray Diagnosis Apparatus Having a Flat Panel Detector for Detecting an X-ray Image" to Takahashi et al. describes an x-ray diagnosis system with signal processing for reducing what is described as 'line artifact noise'. This is described as having a high frequency component which is stable in the row direction and varying in the column direction. As best understood by the inventors, the assumption is that the gate line direction for reading image data is along the image rows. A line-by-line vector is derived from the image array. These values are then used to correct the medical image array, line-by-line, using a value from this vector. This can be done, for example, by subtracting an offset value for each pixel in a line, based on the corresponding value from the error vector. This method presupposes a fixed direction of the artifact fluctuations. While such an assumption may prove workable for a specific system having tightly integrated image acquisition and processing hardware, however, it does not address the more general case of 'open system' applications. A drawback of this type of approach is that it works acceptably only when noise affects every pixel in a row in the same way. This approach would not work well in cases where noise affects the line or row of pixels differently, depending upon their relative position along the line.

Thus, although various solutions have been proposed for addressing the problem of EMI-induced noise with DR imaging, these various approaches do not deal successfully with the situation wherein noise effects from EMI or other sources may vary spatially and temporally not only between systems, but also for a DR receiver used as part of the same imaging system and where these effects on the image can be difficult to predict.

SUMMARY OF THE INVENTION

It is an object of the present invention to advance the art of artifact detection and suppression in radiographic images. With this object in mind, the present invention provides a method of reducing artifacts in a digital radiographic image comprising: identifying either a row or column direction for the artifacts in the image data as a predominant direction; obtaining a measurement of the image data frequency content that is subject to the artifacts from the image content according to the predominant direction; testing the measurement of image data frequency content subject to the artifacts according to a predetermined threshold; and reducing the artifacts when the predetermined threshold is exceeded by: generating one or more suppression factors according to the testing results; decomposing the image content into at least two frequency bands in each row and column direction; applying the one or more suppression factors to modify at least one of the frequency bands; and recomposing the image content by recombining the at least one modified frequency band with one or more other bands into which the image had been decomposed.

It is an advantage of the present invention that it uses the image data itself for both detection and correction of image artifacts, rather than requiring that additional data be obtained for characterizing EMI or other noise source.

These objects are given only by way of illustrative example, and such objects may be exemplary of one or more embodiments of the invention. Other desirable objectives and advantages inherently achieved by the disclosed invention may occur or become apparent to those skilled in the art. The invention is defined by the appended claims.

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

FIG. 5 shows generation of a suppression factor vector.

DETAILED DESCRIPTION OF THE INVENTION

Figure 1:
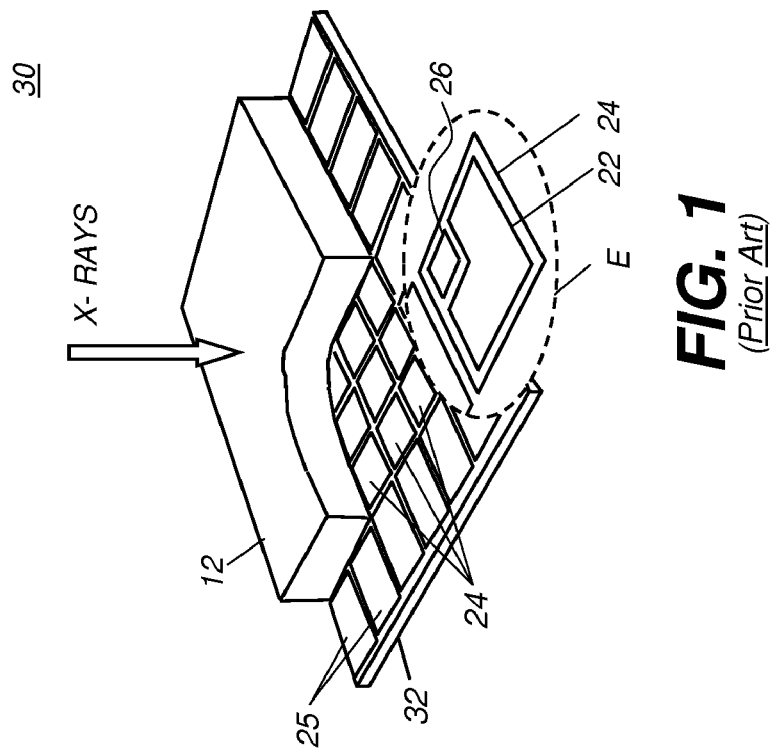
FIG. 1 is a perspective, partial cutaway view showing a small portion of a DR panel.

The following is a detailed description of the preferred embodiments of the invention, reference being made to the drawings in which the same reference numerals identify the same elements of structure in each of the several figures.

Embodiments of the present invention recognize that while some noise sources may indeed affect each pixel equally in a complete row of pixels, such behavior is not typical of EMI-induced noise. Instead, the inventors have found that artifacts resulting from EMI-induced noise have a two-dimensional nature, extending across a portion of successive rows. For this reason, solutions described in the Background section given earlier fail to deal with EMI effects in a satisfactory manner. It must be noted that the methods described herein are not limited only to correction of artifacts resulting from EMI-induced noise, but can be applied more generally to imaging artifacts that have a pattern similar to that caused by EMI.

Figure 2:
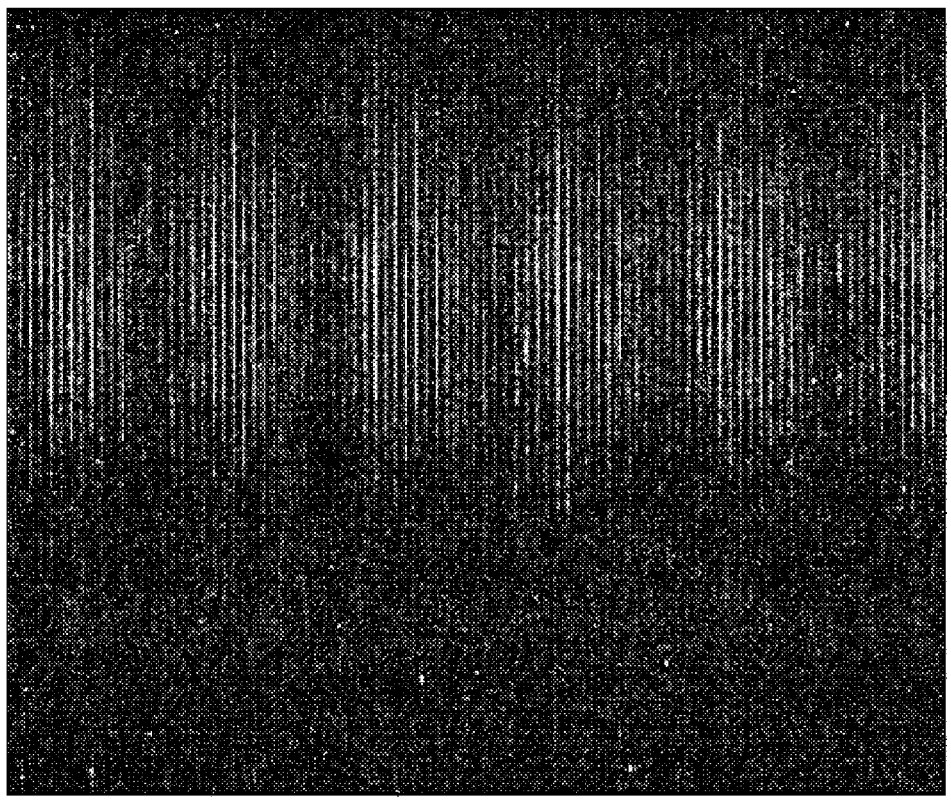
FIG. 2 is a plan view of a uniform radiography image that exhibits EMI-related noise.

Referring to the example of FIG. 2, there is shown the effect of EMI on a uniform exposure obtained from a DR receiver, with image contrast enhanced for emphasis. Noise effects are apparent in both orthogonal directions. As labeled in this figure, pixels within each row are aligned along the x direction, which can also be considered the "row" direction. Rows are arranged adjacent to each other in the y or "column" direction, orthogonal to the row direction. In this example, the predominant EMI-related noise artifact appears as a type of "banding" that affects the same "vertical" portions of adjacent rows, but is not distributed or varying as much "horizontally" along the full row itself. This effect, although it generates a noise pattern, would not be considered predominantly as a type of "row noise", since it has different effects on different portions of the row. Thus, the noise introduced cannot be described as the addition of a simple offset value to the data of each pixel of a row of the image, or as the multiplication of a simple gain value to the data of each pixel of a row of the image. The noise pattern in FIG. 2 would be characterized as being predominantly "column noise".

Figure 3:
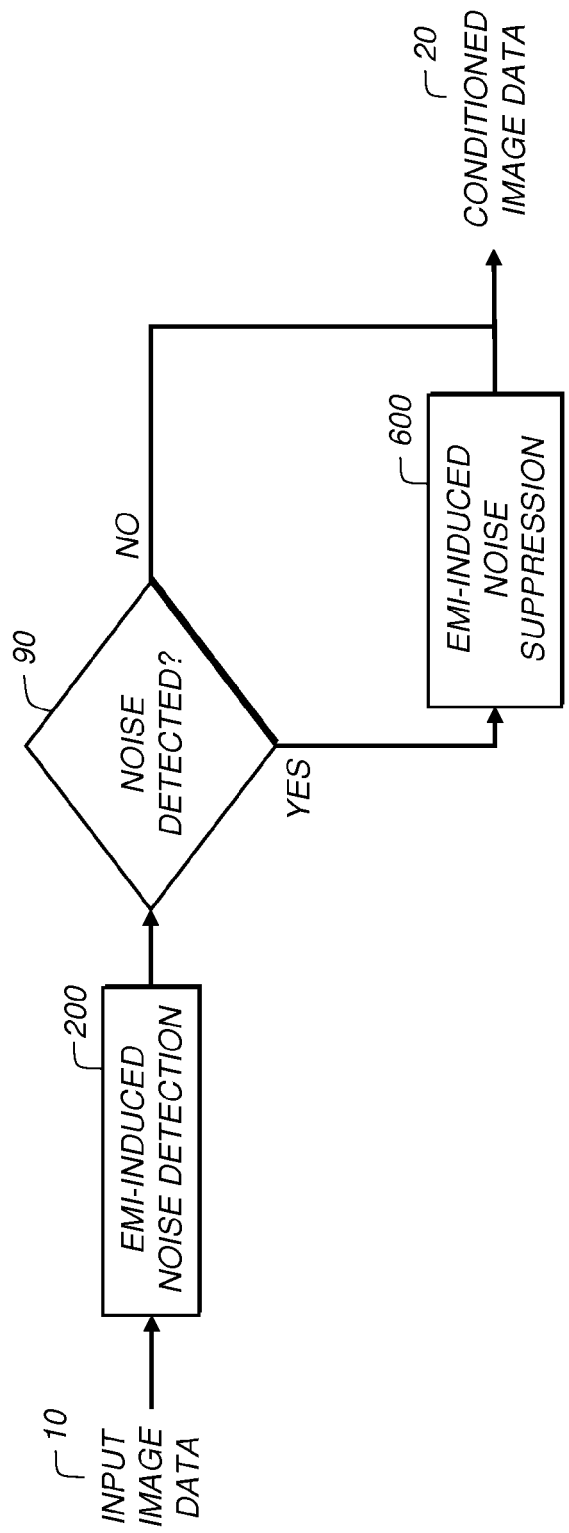
FIG. 3 is a logic flow diagram showing the EMI detection and noise suppression sequence that is applied to radiography image data.

The block diagram of FIG. 3 shows the basic components of a system for EMI artifact suppression. Unprocessed input image data 10 from the DR receiver panel first goes to an EMI noise detection process 200 that checks the image array data for the type of row/column banding effect shown in FIG. 2. If EMI artifacts are detected in a test step 90, the image data then goes to an EMI noise suppression process 600 and is provided as conditioned output image data 20. Where no EMI artifacts are found, the image data are provided as conditioned output image data 20, without the intermediate processing.

For the detailed description that follows, the input data array is represented 20 by:

$s_{i,j}$; i=1, . . . ,M rows and j=1, . . . , N columns,

EMI Noise Detection

Figure 4A:
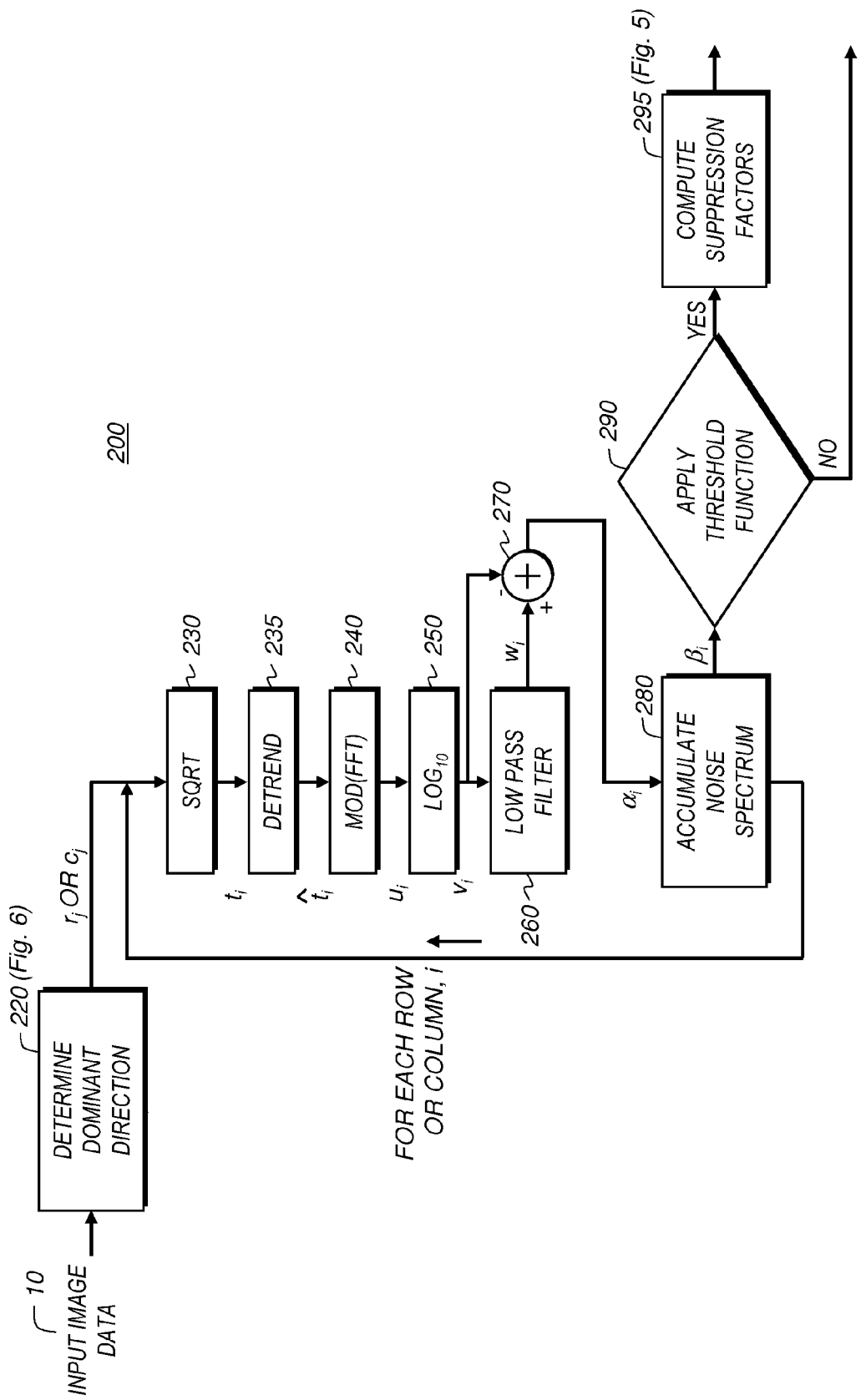
FIG. 4A is a logic flow diagram showing noise detection processing according to one embodiment.

FIG. 4A shows a block diagram of EMI noise detection process 200 in one embodiment. This processing takes advantage of the dominant one-dimensional components of EMI induced noise. Input image data 10 are input to this sequence. A direction determination step 220 makes an initial determination of the predominant row or column direction in which the noise artifact is exhibited. Direction determination step 220 is described in more detail subsequently, with reference to FIG. 6.

Continuing with the sequence of FIG. 4A, once the predominant direction, row or column, is identified, the method for EMI-induced noise detection proceeds with steps 230 through 280, repeated for each row or column, as determined from direction determination step 220. For the following description, it is assumed that the dominant direction for the EMI-induced noise fluctuations is down the column (y) direction, as is the case with the example image of FIG. 2. In step 230, for each column of input image data 10 from the photosensor array, the square-root is computed for each value. For example, for column J, $t_J = \sqrt{s_{i,J}}$, i=1, . . ., M. (a vector of length M)

This step is performed in cases where the input image array values are approximately proportional to x-ray exposure on the detector. Where this is the case, the column values $t_J$ after step 230 processing are then proportional to the square-root of exposure. If the input image array values are not encoded as proportional to exposure, then an alternate, modified transformation can be applied at step 230. This can be, for example, in the form of a look-up table (LUT), so that the output of this operation is a set of values that are approximately proportional to square-root of the exposure at the detector.

In effect, step 230 transforms the image array data so that the amplitude of the actual image content fluctuations (not the EMI-induced noise) due to the quantum nature of x-ray exposure does not vary substantially with overall local image signal level. This conditions the image data so that the inherent signal-to-noise ratio of the x-ray image does not vary appreciably between darker and lighter areas of an image field. As a result, the detectability of artifacts from EMI-induced image noise is improved.

Still referring to FIG. 4A, for column J the vector $t_J$ from step 230 is now subjected to a detrending operation in a detrending step 235, wherein a function, typically a linear function, is fit to the vector and subtracted from the values. Fitting a linear function to the vector requires estimating a slope and offset by minimizing an error function such as mean-squared error. This type of detrending operation is used in the image processing arts to help reduce the influence of slowly varying image signal effects ("trends") prior to estimating noise statistics. In the present case, applying this step reduces the influence of anatomical content in the subsequent discrete Fourier transform step, particularly at low spatial frequencies. In this embodiment, the output of step 235 is:

$\hat{t}_{i,J} = t_{i,J} - (a+bi)$, i=1, . . . ,M where a and b are the offset and slope values, respectively, for the linear fit to the column vector, $t_J$. In some cases it can be advantageous to perform the detrending operation prior to the square-root transformation in preceding step 230.

In a frequency transform step 240 the discrete Fourier transform, computed using a fast Fourier transform (FFT) algorithm, or some other suitable frequency transform, is then computed for the column of pixels being processed. The overall form and application of the fast Fourier transform is well-known. The output of step 240 is a corresponding vector of the modulus (magnitude) of the FFT of $t_J$, $u_{i,J} = |FFT(\hat{t}_{i,J})|$ i=1, . . . ,M/2 where |...| indicates the modulus or magnitude of a complex number.

Transformation by the FFT, or other suitable frequency transform, expresses the EMI-induced noise fluctuations as a function of spatial frequency, rather than of pixel spatial location. Frequency transformation is particularly helpful when the fluctuations contain periodic or approximately periodic patterns. EMI-induced noise often contains such fluctuations due to the oscillating nature of the underlying electromagnetic field variations from switching electronics, power supplies, and other equipment.

Figure 4B:
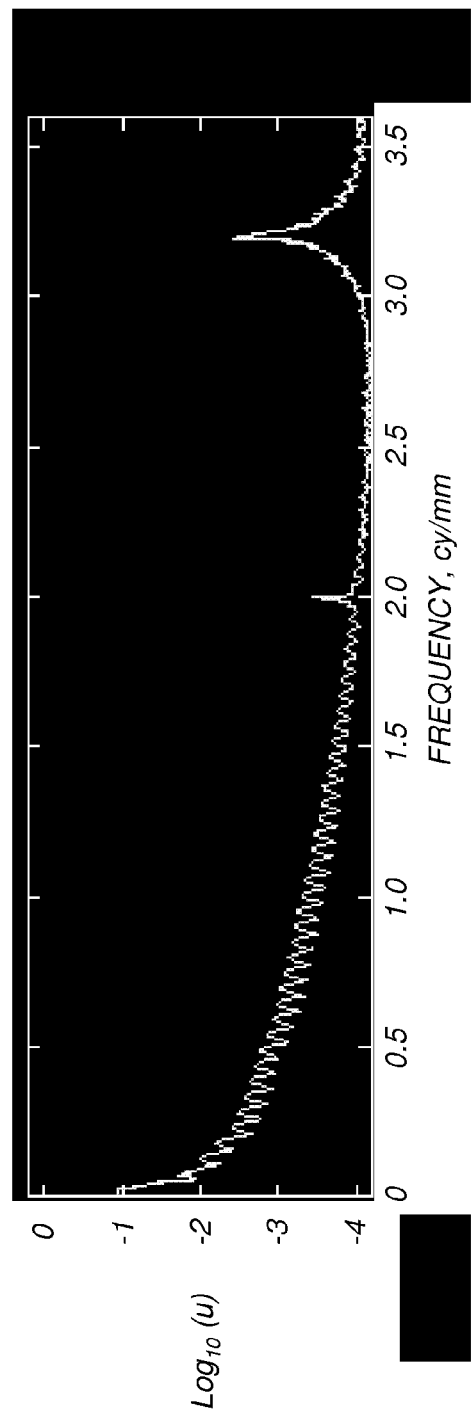
FIG. 4B is a graph showing the modulus of a Fourier transform of image column data.

This is demonstrated in FIG. 4B for an example of this modulus of the spectrum of the image column data. The vector u (averaged over all columns) is shown with the index, i=1, . . . ,M/2, plotted as spatial frequencies in the anatomical objects. In this example, peaks occur in two places. The second peak P2 at approximately 3.35 cy/mm could be due to the x-ray grid which is part of the equipment. In this case, the signal at this frequency is not due to EMI-induced noise, and can be excluded from the detection step that follows. However, the first peak P1 near 2 cy/mm, is very likely due to EMI-induced noise.

Referring back to FIG. 4A, in a logarithmic conversion step 250, the logarithm is then computed for each element of $u_J$:

$v_{i,J} = \log_{10}(u_{i,J})$, i=1, . . . , M/2.

This processing helps to emphasize large relative fluctuations and to decrease the sensitivity to acceptable variations.

In a filtering step 260, the output of step 250 is then filtered by a one-dimensional convolution-type filter that suppresses high-frequency variations. This is known as a low-pass filter; one exemplary embodiment would be in the form of a running average. The convolution operation is well-known in the image processing arts, and the special case of a moving average of approximately 5 local elements often achieves the desired smoothing of the modulus of the FFT for the logarithm obtained from the row of image array values. This filtered vector can be designated:

$$w_J = v_J \otimes fil$$

where ⊗ indicates discrete convolution, and fil is a vector similar to:

$$fil=[0.2,0.2,0.2,0.2,0.2].$$

This filtered vector $w_J$ is subtracted, element-by-element, from the corresponding unfiltered vector $v_J$ in a subtraction step 270:

$$\alpha_{i,J} = v_{i,J} - w_{i,J}, i=1, \ldots, M/2.$$

Low-pass filtering in step 260 and a subtraction step 270 help to separate the true scene content of the imaged anatomy from the undesirable EMI-induced noise components. This provides noise characterization in the spatial frequency domain. Deviation from a relatively smooth, nominally decreasing function of spatial frequency would be expected in the presence of EMI-induced noise. At this point, the vector $\alpha_J$ is seen as a measure, along the image array column J, of noise fluctuations that, due to the detrending and other processing, are largely isolated from anatomical image content in the frequency domain.

Still continuing with the sequence of FIG. 4A, the vector $\alpha_J$ for each image array column (J=1, . . . ,M) is then accumulated in an accumulation step 280. Each value of the accumulated sum is divided by the number of columns (M) so that the average vector over all image array rows is obtained as the noise frequency vector at the output of accumulation step 280:

$$\beta_i = \frac{2}{M} \sum_{j=1}^{M/2} \alpha_{i,j}, \quad i=1, \ldots, M/2.$$

This step obtains $\beta_i$ as a measurement of the image data frequency content that is subject to the artifacts from the image content according to the predominant direction. The test for the presence of EMI-induced noise is applied, using this $\beta_i$ measurement, in a test step 290. This can be done, for example, by bounding the resulting noise frequency vector $\beta$ within upper and lower values. For such a case, for example:

$$upper_i = 0.05[1\ 1\ \ldots\ 1]; i=1, \ldots, M/2.$$

$$lower_i = -0.05[1\ 1\ \ldots\ 1], i=1, \ldots, M/2.$$

If some fraction of the elements of noise frequency vector $\beta$ fall outside of the range spanned by $upper_j$ and $lower_j$ values, EMI-induced noise is detected. This is shown by example in FIG. 4C. The vector $\beta$ is plotted with the index, j=1, . . . ,M/2, plotted as spatial frequencies in the anatomical objects. Note that the underlying signal spectrum which is a falling function of spatial frequency in FIG. 4B has been largely removed by detrending step 235 as well as by filter step 260 and subtraction step 270. The resulting modified spectrum is centered about zero, allowing the single application of upper and lower control limits. These are also shown as dashed lines. Alternative methods for characterizing the noise frequency vector $\beta$ could also be used.

EMI Noise Suppression

A computation step 295 then computes one or more suppression factors when the threshold has been exceeded. In this case, step 295 computes one or more scaling factors that are used in noise suppression. This step is omitted where the noise frequency vector $\beta$ lies within the thresholds.

When EMI-induced noise is detected, the noise-frequency vector $\beta$ is then used to adjust the sensitivity of the subsequent EMI noise suppression operation. As described in more detail subsequently, the noise suppression for fluctuations along the column direction operates on the 'y-edge fine' and 'y-edge coarse' signals in one embodiment. These components of the EMI-induced noise can be identified by their spatial frequency components, available in the form of the noise-frequency vector, $\beta$. The scale factors $S_f$ and $S_c$ that are used in the noise-suppression of the fine and coarse components are identified in terms of the desired frequency weighting in the form of a matrix. If the noise-frequency vector $\beta$ has M/2 elements it can be seen as an (M/2×1) vector, where the elements run from low to high spatial frequencies. The desired spatial frequency weights for the coarse and fine weighting factors are expressed as vectors:

$$wc=[c_1\ c_2 \ldots c_{M/2}]\text{ for coarse, and}$$

$$wf=[f_1\ f_2 \ldots f_{M/2}]\text{ for fine.}$$

Then, weighting factors based on the noise content observed can be derived using matrix multiplication:

$$S_{fac} = \begin{bmatrix} wc \\ wf \end{bmatrix} \beta.$$

For example the weighting matrix might be of the form:

$$\begin{bmatrix} wc \\ wf \end{bmatrix} = \begin{bmatrix} 0 & \ldots & a_\psi & \ldots & a_{\psi+\gamma} & a_{\psi+\gamma+1} & 0 & \ldots & 0 \\ 0 & \ldots & 0 & \ldots & 0 & b_{\psi+\gamma+1} & \ldots & b_{\psi+\gamma+\eta} & 0 \end{bmatrix}$$

where $\psi$, $\gamma$, and $\eta$ are constant integers chosen based on the desired frequency weighting and range. The resulting matrix $S_{fac}$ has two elements, $$S_{fac} = \begin{bmatrix} S_c \\ S_f \end{bmatrix}$$

which are the scale factors needed for EMI-induced noise suppression in a subsequent step.

FIG. 5 shows generating a weighting factor for the column direction, where $\beta$ is the noise frequency vector.

Direction Determination Step 220

Although artifacts from EMI-induced noise may be most apparent in the pixel column direction (y) for many detector designs, there can also be detector readout architectures under which these artifacts occur in the row (x) direction. The initial direction determination step 220 identifies the predominant direction of EMI effects, whether row or column, and adapts the detection and suppression processing that follows to handle EMI effects in either direction.

Figure 6:
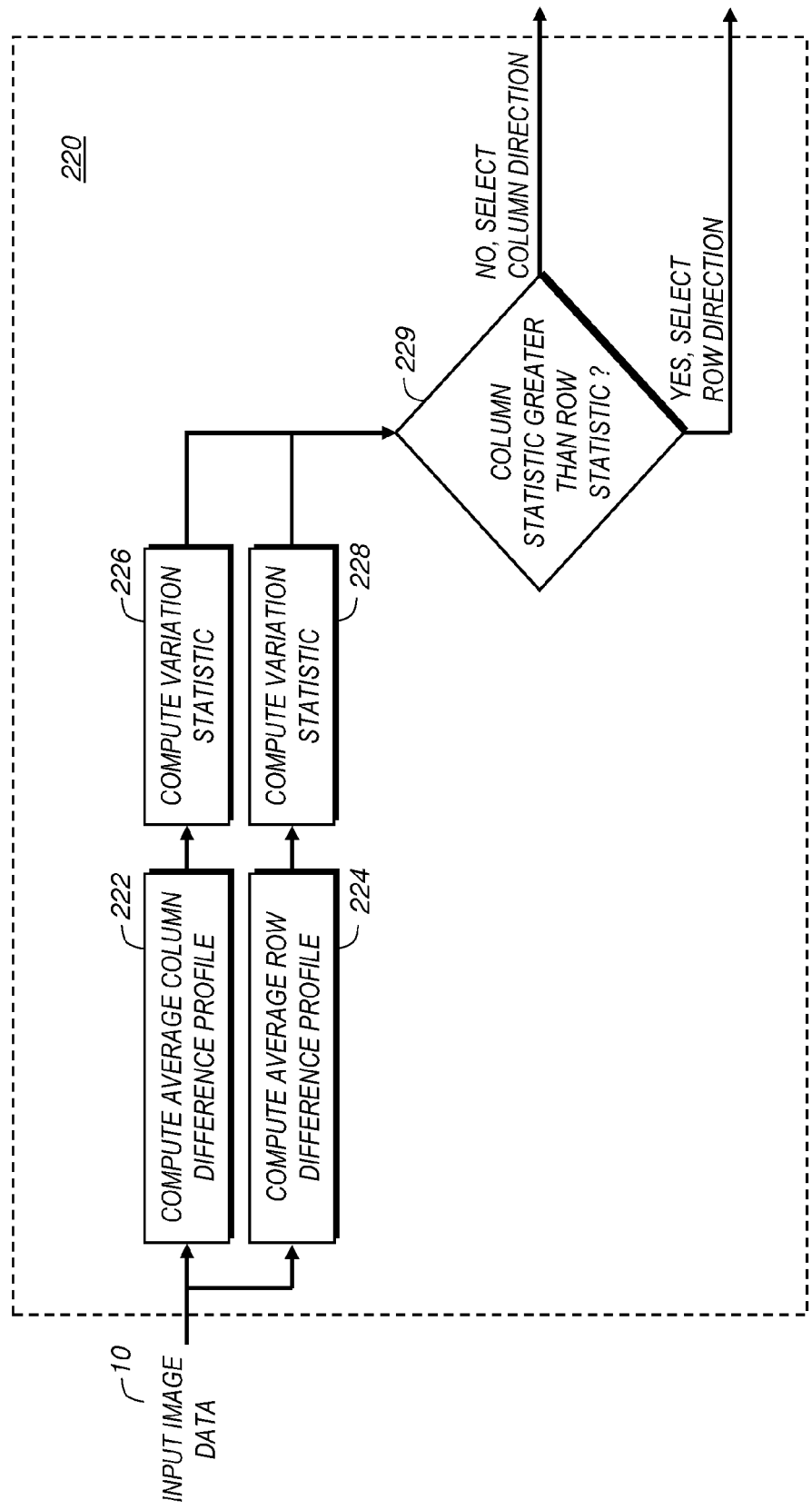
FIG. 6 is a logic flow diagram that shows direction determination.

The logic flow diagram of FIG. 6 shows the sequence of procedures used for direction determination step 220 in one embodiment. Steps 222 and 224 respectively compute average column and row difference profiles.

Here, from the array of image data values, the average column difference profile is computed in step 222; the average row difference profile is computed in step 224. The average row difference profile is computed as a vector of length N:

$$r_j = \frac{\sum_{i=1}^{M} |s_{i,j} - s_{i,j-1}|}{M}, \quad j = 1, \ldots, N.$$

and the average column difference profile is, correspondingly, a vector of length M:

$$c_i = \frac{\sum_{j=1}^{N} |s_{i,j} - s_{i-1,j}|}{N}, \quad i = 1, \ldots, M.$$

These vectors (c and r) are then inputs to computation steps 226 and 228, respectively. In these steps, a variation statistic, such as the sample standard deviation is computed. The form of this and similar statistics such as the mean absolute deviation are well known.

The output values from steps 226 and 228 are then compared in a test step 229. If the column variation statistic is greater than the row variation statistic, then the column direction is taken to be the predominant direction for possible EMI-induced noise. Conversely, if the row variation statistic is not greater than the column variation statistic, then the row direction is taken to be the predominant direction for possible EMI-induced noise.

Figure 7:
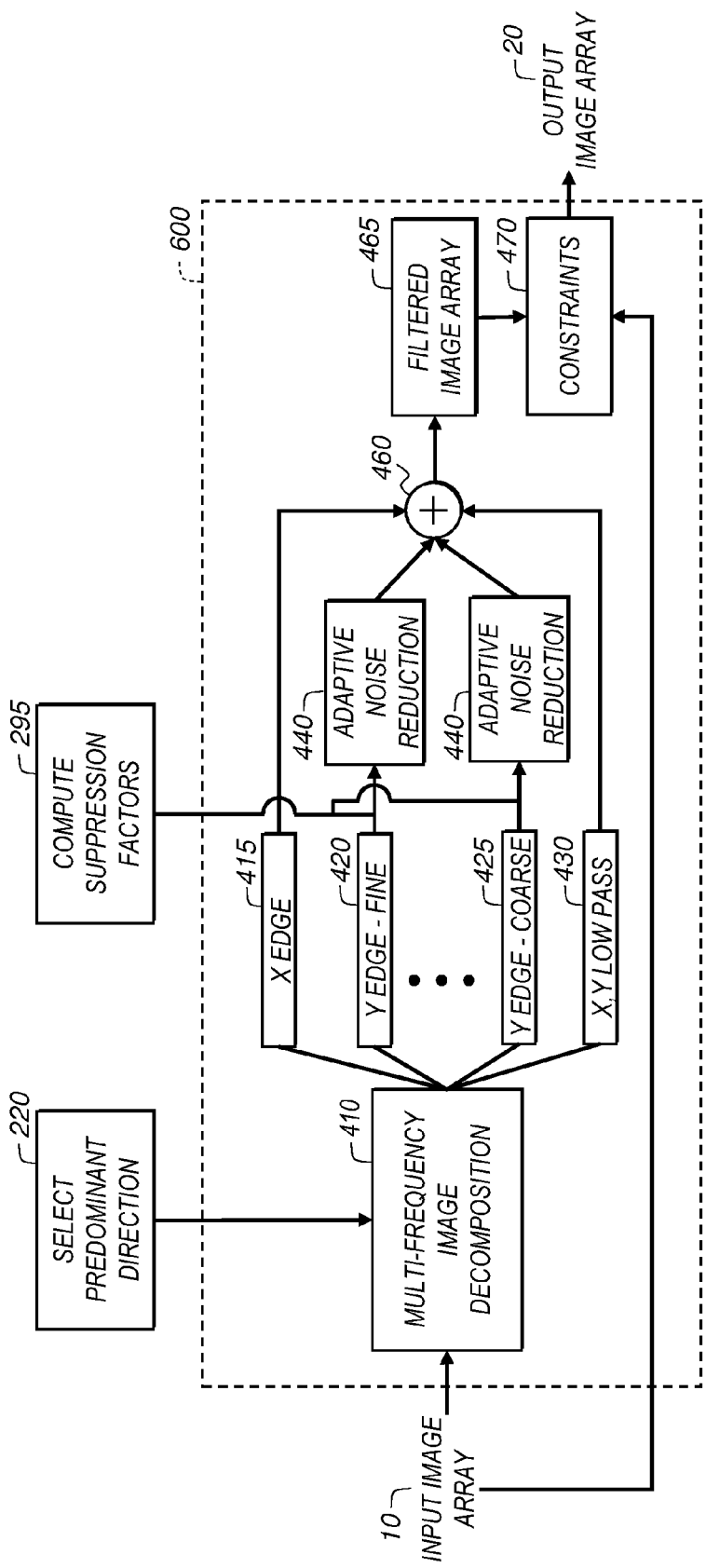
FIG. 7 is a logic flow diagram showing a sequence of steps for suppressing EMI-induced noise.

The logic flow diagram of FIG. 7 shows a sequence of steps for suppressing EMI-induced noise. The input image array is received by a decomposition step 410, where the image is decomposed into frequency sub-bands using a multi-frequency decomposition strategy. The precise nature of the decomposition depends upon the predominant direction of the EMI-induced noise, information which is provided from the output of step 220. For the following description it is assumed that the predominant direction is along the column (y) direction.

Figure 8:
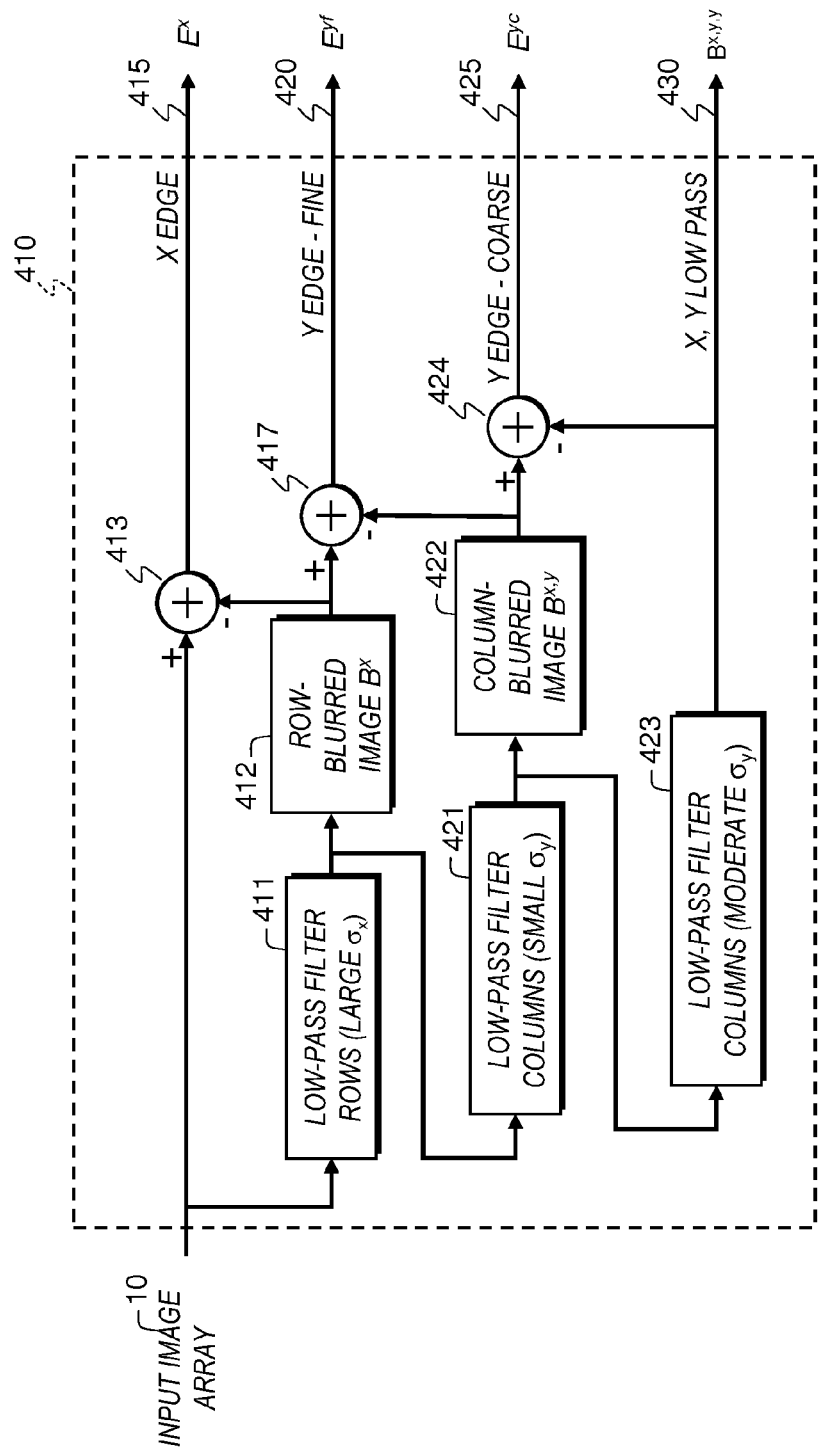
FIG. 8 shows a method for multi-frequency decomposition.

FIG. 8 shows the steps for the multi-frequency decomposition of the input image into sub-bands in step 410. First, the rows of the input image s are filtered at step 411 with a large-scale kernel to produce a row-blurred image $B^X$ 412. In a preferred embodiment, the filtering operation is implemented by convolving the input image row with a Gaussian shaped kernel $g^{\sigma_x}$:

$$B_{i,j}^X = \sum_n s_{i,n} \cdot g_{j-n}^{\sigma_x}$$

where $g_n^{\sigma_x}$ is the Gaussian filter defined by $$g_n^{\sigma_x} = \frac{1}{\sqrt{2\pi\sigma_x^2}} \cdot \exp\left(-\frac{n}{2\sigma_x^2}\right)$$

In this row blurring operation, the spatial extent of the filter $g_n^{\sigma_x}$ is chosen to be as large as possible to blur the fine to moderate details within the input image along the row direction, but the spatial extent is not so large as to significantly blur the gross variations along the row direction due to the EMI-induced noise signal.

The x-edge image $E^X$ 415 is derived by subtracting blurred image $B^X$ 412 from input image s 10 in a subtraction step 413:

$$E^X = s - B^X$$

Next, the columns of the row-blurred image $B^X$ are filtered at a filter step 421 with a small scale kernel to produce a first column-blurred image $B^{X,Y}$ 422. In a preferred embodiment, the filtering operation is implemented by convolving the columns of the row-blurred image 412 with a Gaussian shaped kernel $g^{\sigma_{y_1}}$ $$B_{i,j}^{X,Y} = \sum_n B_{n,j}^X \cdot g_{i-n}^{\sigma_{y_1}}$$

In this column blurring operation, the spatial extent of the filter is chosen to be small, spanning relatively few pixels, just large enough to cover a cross-section profile of the EMI-induced noise which itself typically spans about 1-3 input image rows. Selecting $\sigma_{y_1}=1.0$ suits this purpose. The fine y-edge image $E^{Y_f}$ 420 is derived by subtracting blurred image 422 from row-blurred image 412 in step 417.

$$E^{Y_f} = B^X - B^{X,Y}$$

Next, the columns of the first column-blurred image $B^{X,Y}$ 422 are filtered at step 423 with a moderate scale kernel to produce a second column-blurred image $B^{X,Y,Y}$ 430. Again, in a preferred embodiment, the filtering operation is implemented by convolving the columns of the first column-blurred image 422 with a Gaussian shaped kernel $g^{\sigma_{y_2}}$ $$B_{i,j}^{X,Y,Y} = \sum_n B_{n,j}^{X,Y} \cdot g_{i-n}^{\sigma_{y_2}}$$

In this column blurring operation, the spatial extent of the filter is chosen to be moderate in size, spanning enough pixels to significantly blur the EMI-induced noise. For example, selecting $\sigma_{y_2}=2.5$ suits this purpose. The coarse y-edge image $E^{Y_c}$ 425 is derived by subtracting the second column-blurred image 430 from first column blurred image 422 in step 424:

$$E^{Y_c} = B^{X,Y} - B^{X,Y,Y}$$

At this point, the decomposition of input image s 10 into the multi-frequency decomposition at step 410 may be expressed as the sum of sub-bands:

$$s = E^X + E^{Y_f} + E^{Y_c} + B^{X,Y,Y}$$

Figure 9:
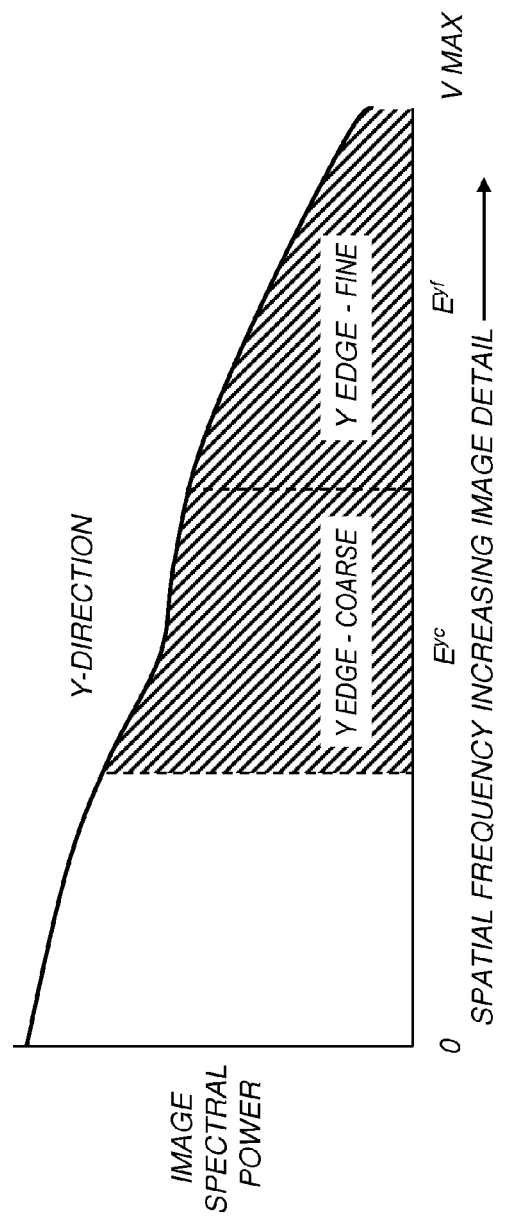
FIG. 9 shows a plot of relative spectral power to frequency for the y-direction (column direction) for an example image.
Figure 10:
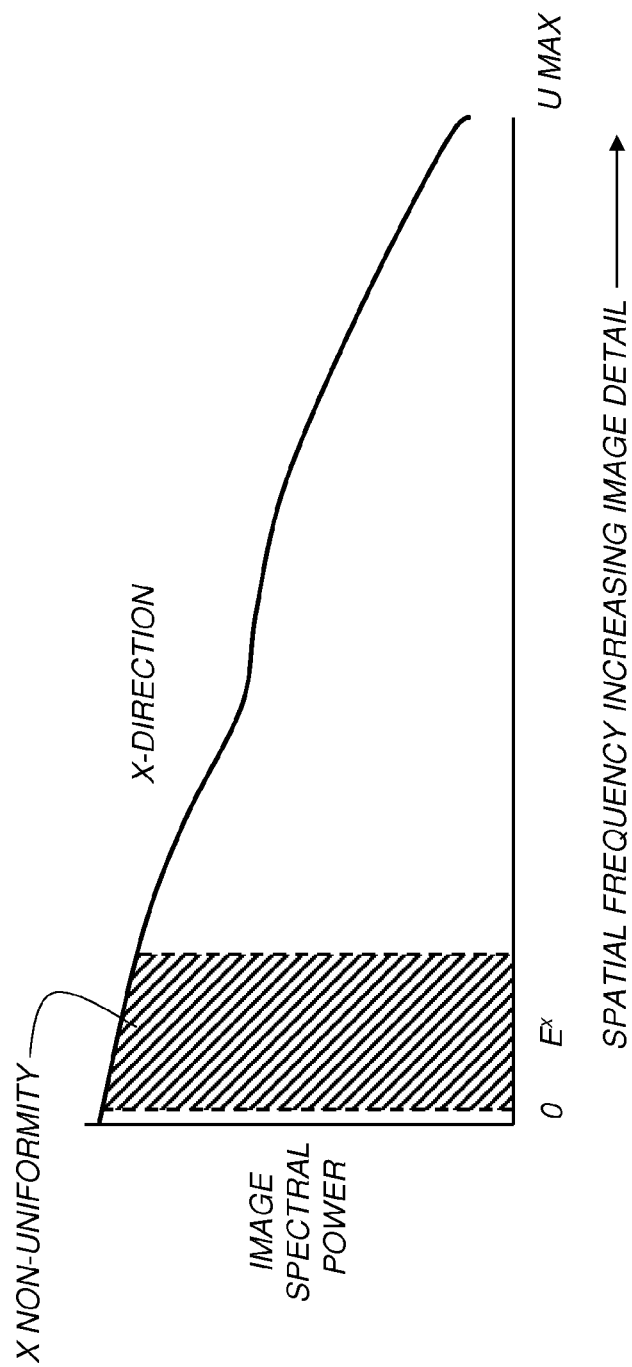
FIG. 10 shows a plot of relative spectral power to frequency for the x-direction (row direction) for an example image.

The two y-edge sub-bands $E^{y_1}$ 420 and $E^{y_c}$ 425 represent spatial frequencies that are fine to coarse in the column (y) direction, as shown in FIG. 9. These two sub-bands, 420 and 425, contain the EMI-induced noise and are subject to further processing for reducing this noise. FIG. 10 shows a sub-band in the row (x) direction. It must be observed that this example assumes that the predominant EMI noise is in the column (y) direction; if this noise is in the row (x) direction, the corresponding orthogonal differences apply.

Figure 11:
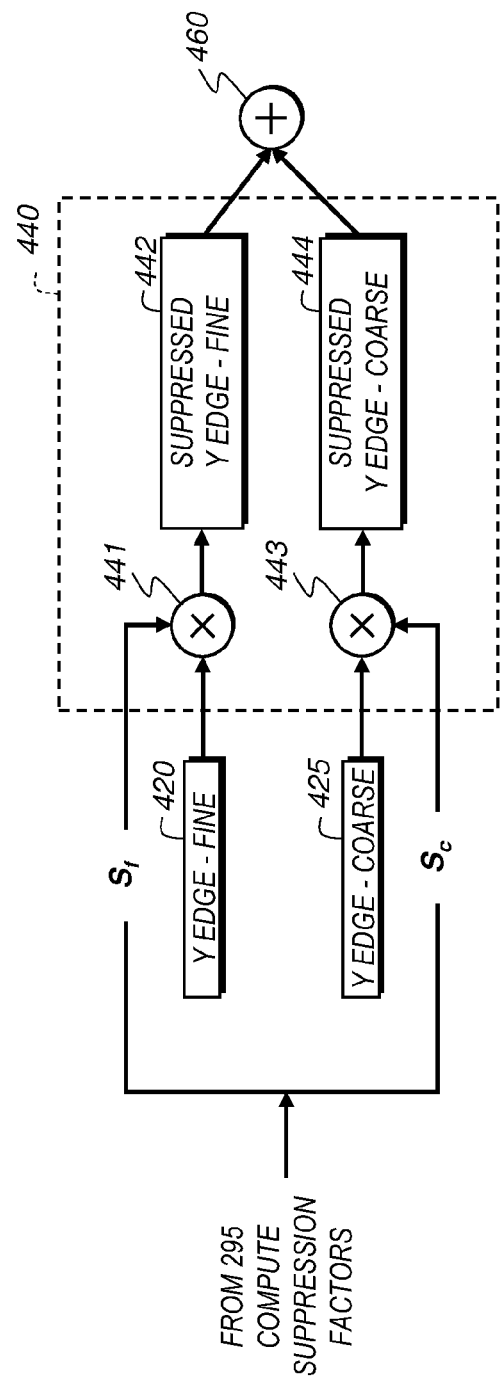
FIG. 11 is a logic flow diagram showing adaptive noise reduction processing.

Referring to FIG. 11, just after the multi-frequency decomposition step 410, the two y-edge sub-bands are input into an adaptive noise reduction step 440. In this step, two scale parameters determined from step 295 are used to modify the y-edge sub-bands 420 and 425. With respect to the example in FIG. 11, the scale parameters are positive numbers $S_f<1$ and $S_c<1$ used to scale the y-edge sub-bands by simple multiplication, steps 441 and 443, to produce suppressed y-edge sub-bands 442 and 444:

$$E_s^{Yf} = s_f \cdot E^{Yf}$$

$$E_s^{Yc} = s_c \cdot E^{Yc}$$

Returning back to FIG. 7, it should be observed that multi-frequency decomposition can be expanded beyond the number of frequency components shown. Thus, for example, there may be advantages to decomposition using a finer resolution, so that there are additional bands ranging from coarse to fine in terms of edge detail.

Figure 4C:
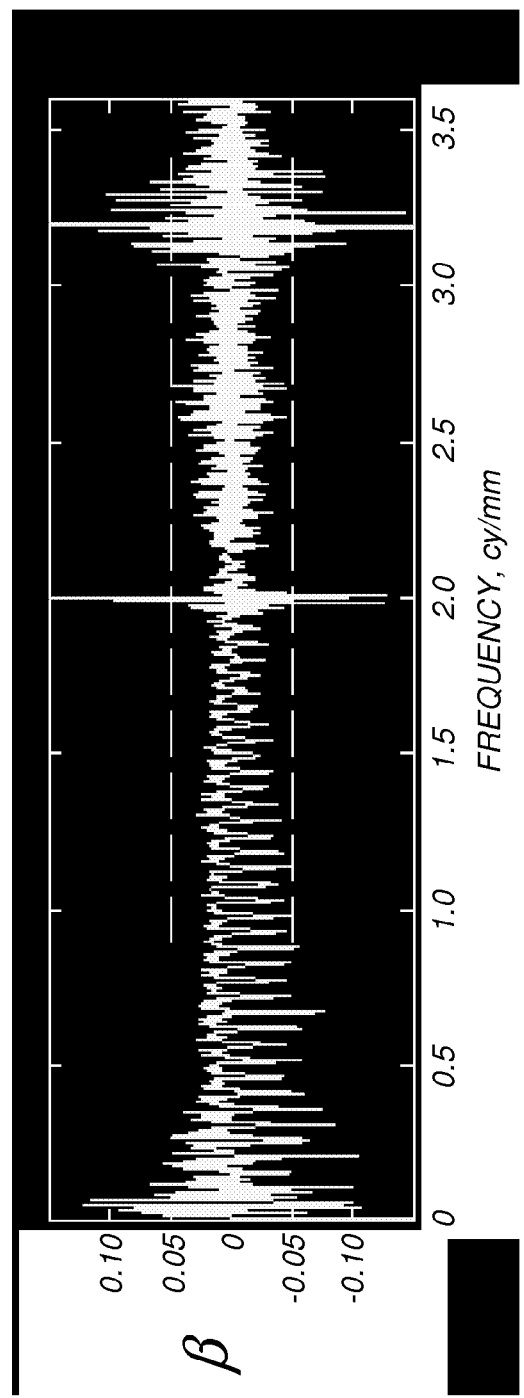
FIG. 4C is a graph of the example of FIG. 4B after subtraction and filtering.

It can also be noted that frequency decomposition can be adaptive, based on the results of processing from the steps described with reference to FIGS. 4A-4C. That is, following processing of the input image data, it is possible to identify particular frequencies at which noise is to be suppressed. Then, using these results, decomposition step 410 can be adapted accordingly.

The selection of the values for $\sigma_{y_1}$ and $\sigma_{y_2}$ can be interpreted in terms of the spatial frequencies that will be targeted in spatial frequency decomposition. The choice of spatial frequencies of interest can, in turn, be identified from the computed noise frequency vector β at the output of step 280 (FIG. 4A).

Figure 12:
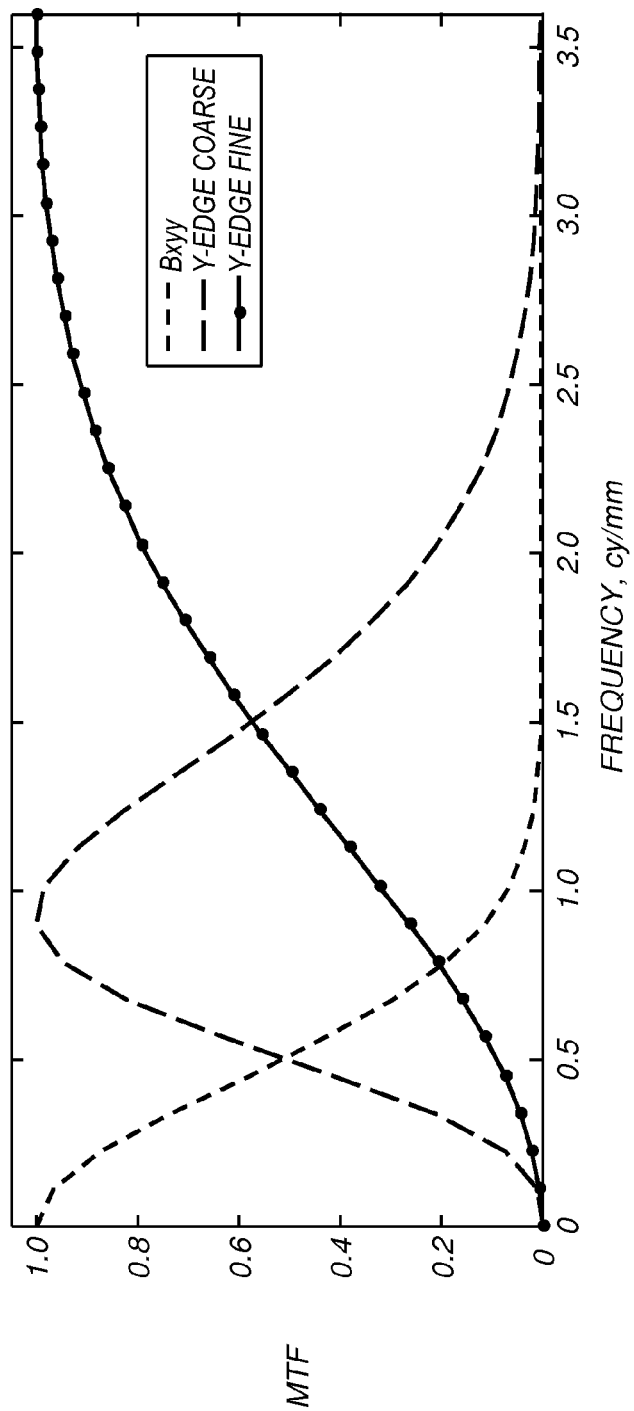
FIG. 12 is a graph showing the frequency responses used in the multi-frequency decomposition in the y-direction for $\sigma_{y_1}=1$ and $\sigma_{y_2}=2.5$.

Referring to FIG. 8, it is known to those skilled in the art that the selection of particular σ values for each Gaussian filter in steps 411, 421 and 423 will result in a corresponding spatial frequency selection characteristic for each modified image signal that is generated as image 420, 425 and 430. In addition, it is known that the frequency response of a Gaussian filter is itself also a Gaussian frequency function. Using a filter with a large value of σ results in more blurring than does using a filter with a lower value of σ. Referring to FIG. 9, the selection of combinations of values for $\sigma_{y_1}$ and $\sigma_{y_2}$ will determine the spatial frequency ranges that are selected from the image information and are used to obtain the frequency decomposition of images 420, 425 and 430. Referring to FIG. 12, the effective normalized spatial frequency weighting, also called the Modulation Transfer function (MTF), for the $B^{xy}$, $E^{Yf}$, $E^{Yc}$ sub-bands is shown on a scale consistent with that of FIGS. 4B and 4C. In this case $\sigma_{y_1}=1$ and $\sigma_{y_2}=2.5$.

In some cases there can be an advantage to adjusting the frequency sensitivities of the frequency decomposition so that the EMI-induced noise is primarily detected by a single signal such as $E^{Yc}$. This may be true when the EMI-induced noise is limited to a narrow range of spatial frequencies. This is the case, for example, for noise characteristics with reference to FIGS. 4B and 4C.

In one embodiment, the noise vector, $\beta_i$, where i is the spatial frequency index, to is used to identify the spatial frequency of the primary noise component within some frequency range of interest.

Figure 13:
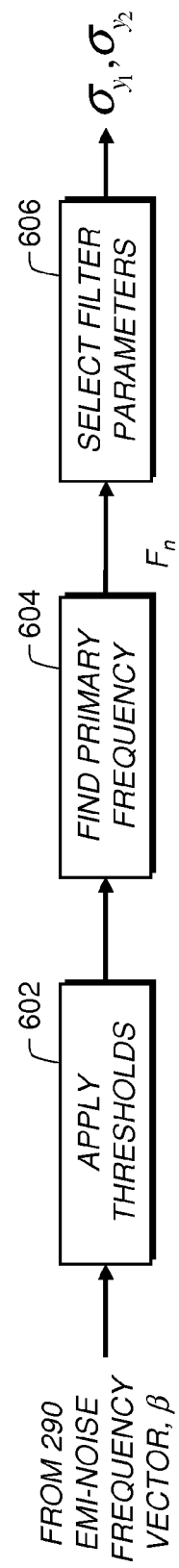
FIG. 13 is a logic flow diagram showing steps in the selection of multi-frequency decomposition parameters.

Referring to FIG. 13, the sequence for obtaining decomposition parameters is shown for one embodiment. A first threshold application step 602 applies the upper and lower threshold values used to detect the presence of EMI-induced noise, upper$_t$ and lower$_t$. Only those frequency index values for which $\beta_i$ is outside this range are retained. Let K be this set of values selected in step 602. A frequency determination step 604 then executes. If the frequency range if interest is [$f_{min}$, $f_{max}$], then the primary noise frequency is the frequency corresponding to:

$$F_n = \max_{i \in K}[\beta_i],$$

and the maximum value lies between indices corresponding to frequencies between $f_{min}$ and $f_{max}$.

Figure 14:
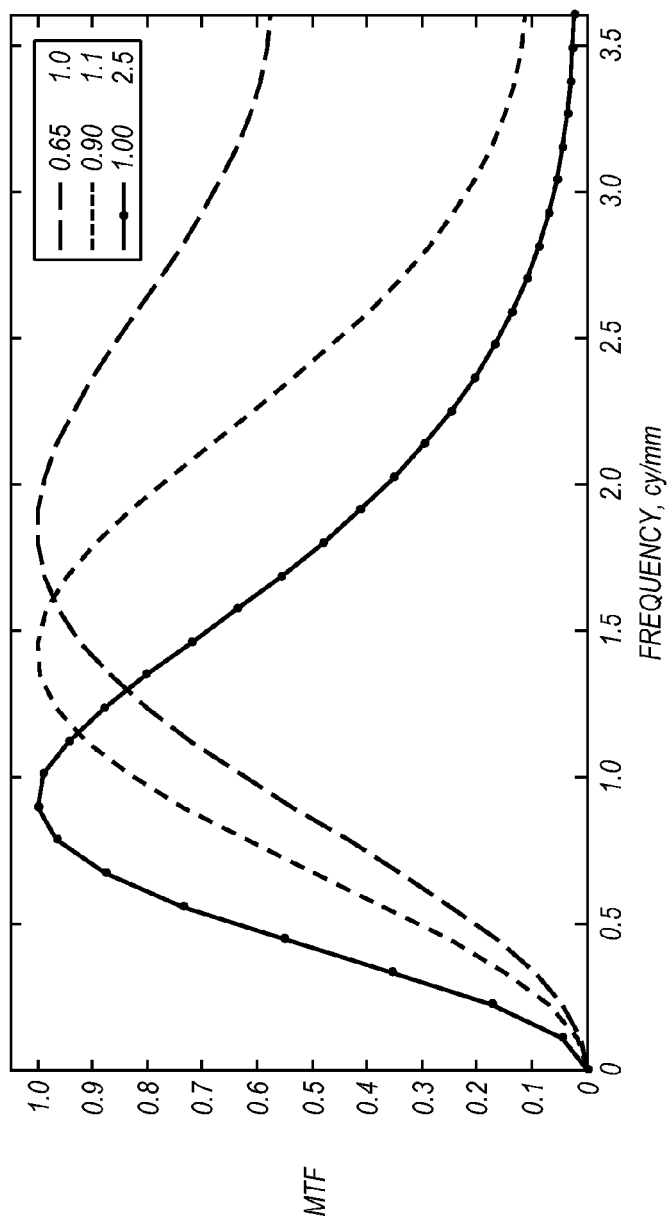
FIG. 14 is a graph showing a set of the frequency responses used in multi-frequency decomposition in the y-direction for the $E^{Y_c}$ signals centered on 1.0, 1.5 and 1.9 cy/mm for an example system.

In a selection step 606, the spatial frequency is then used to select the Gaussian filter sigma parameters that result in decomposition, based on selecting $F_n$ as the center frequency of the 'y-edge coarse' ($E^{Yc}$) signal. FIG. 14 shows three example frequency filter responses, MTFs, for this frequency channel in the decomposition using three selections of parameters. The respective MTFs are approximately centered on 1.0, 1.5 and 1.9 cy/mm, respectively, for this example. The corresponding frequency decomposition parameters for $F_n$ values are:

| $F_n$ | $\sigma_{y_1}$ | $\sigma_{y_2}$ |
|---|---|---|
| 1.0 | 1.0 | 2.5 |
| 1.5 | 0.90 | 1.1 |
| 1.9 | 0.65 | 1.0 | where the units are in pixels, and the sampling interval, or pixel spacing, is 0.14 mm.

Ways to calculate the frequency response of the digital filter using combinations of Gaussian filters are known to those skilled in the art. The above table is computed for suitable values and stored prior to applying the EMI-induced noise detection and suppression steps of this invention. In step 606, the filter sigma parameters that correspond to the primary frequency are chosen from this table.

Figure 15A:
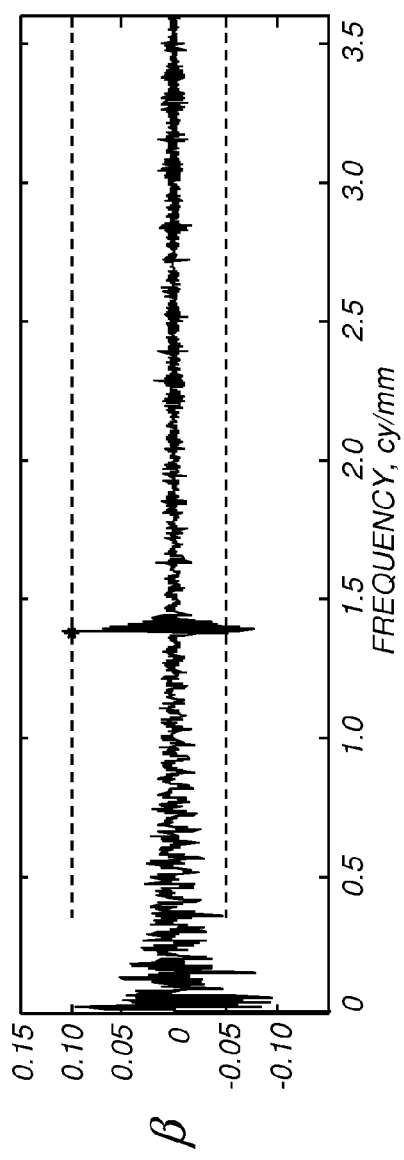
FIG. 15A is a graph showing an example of a measured noise frequency vector $\beta$, with the primary frequency identified.
Figure 15B:
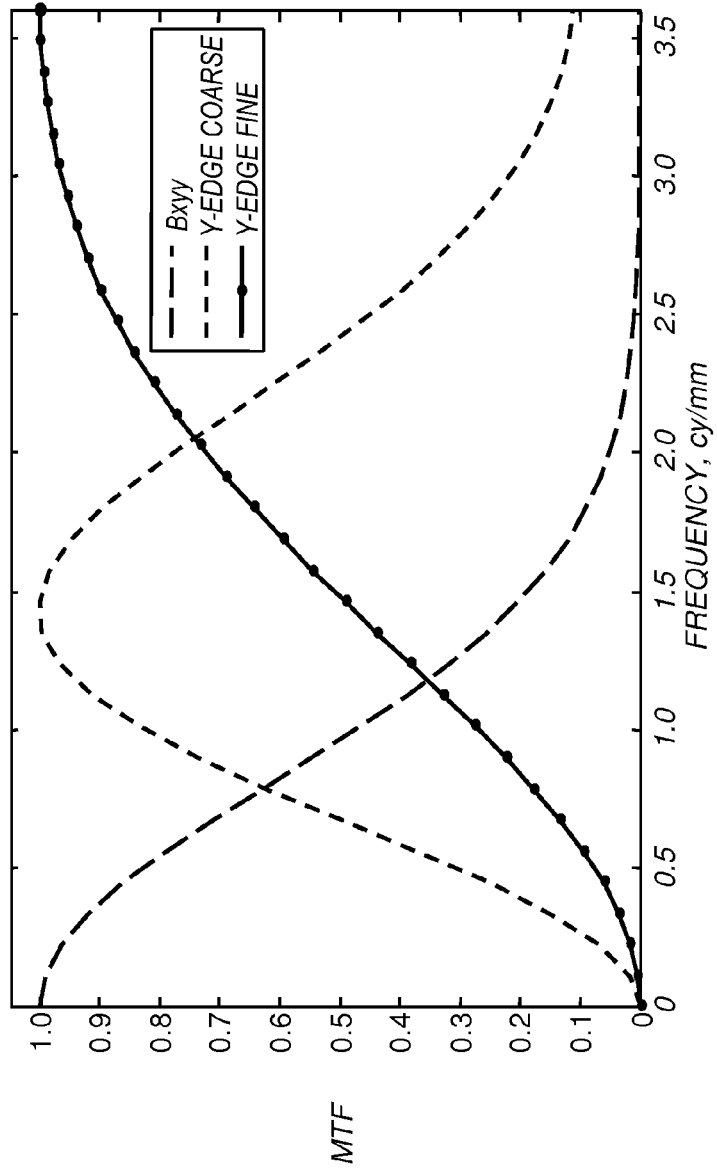
FIG. 15B is a graph showing a set of the frequency responses for a set of multi-frequency decomposition parameters that were automatically selected based on the identification of the noise component near 1.5 cy/mm.

FIG. 15A shows an example noise frequency vector; an asterisk denotes the automatically detected EMI-induced noise frequency. In this example, steps 604, 604, and 606 of FIG. 13 were executed, and the second set of filter parameters given earlier were chosen. The multi-frequency decomposition MTFs were thus adapted to the selection of 1.5 cy/mm as the primary frequency if interest. The resulting multi-frequency decomposition MTFs are shown in FIG. 15B. Alternately, the sets of filters might not have a Gaussian functional form, but would be general spatial filter sets. Adaptive multi-frequency decomposition and subsequent noise suppression can proceed when a table identifying the primary frequency for filter combinations is supplied in step 606.

Note that suppression can be applied to a single band, to two bands, or to more than two bands. Different amounts of suppression can be provided to different frequency bands.

Returning again to FIG. 7, the output of summation step 460, yielding the noise reduced filtered image 465, is represented by the summation:

$$F = E^X + E_s^{Yf} + E_s^{Yc} + B^{X,Y,Y}$$

Over-correction is a possible problem with any type of artifact detection and correction scheme. Although filtered image 465 exhibits suppressed EMI-induced noise, achieved in adaptive noise reduction step 440, the image may now have added artifacts caused by noise reduction processing. To mitigate these possible artifacts, filtered image 465 is subject to additional constraints that are carried out in step 470.

Figure 16:
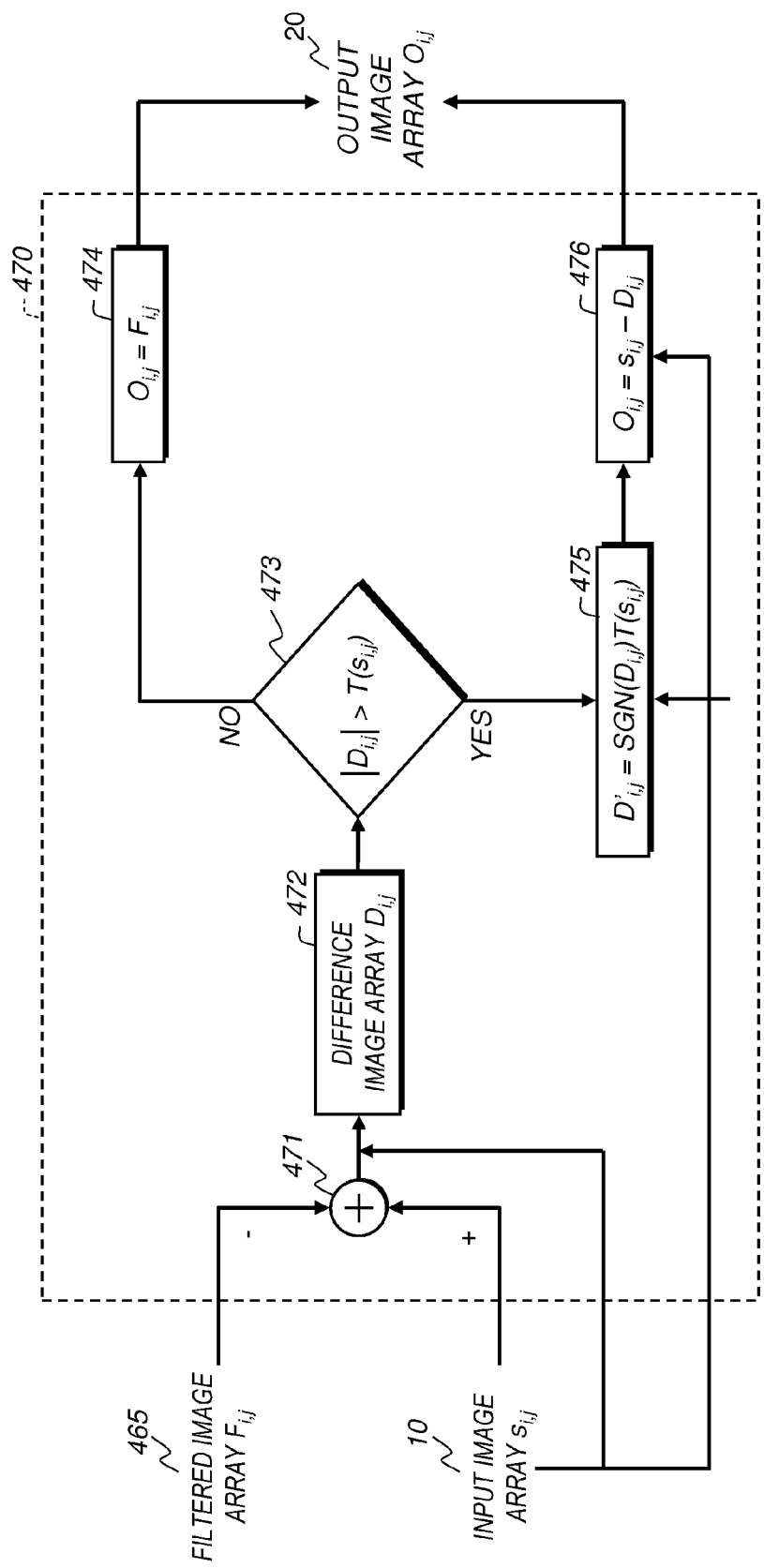
FIG. 16 is a logic flow diagram showing how constraints are applied to reduce artifacts from noise reduction processing.

Referring to FIG. 16, in a subtraction step 471 for imposing the constraints, a filtered image F 465 is subtracted from the original input array data s 10 to form difference image D 472:

$$D = s - F$$

For each pixel location i,j in the difference image, the magnitude of the corresponding value from difference image $D_{i,j}$ 472 is checked against a signal-dependent threshold value T in a comparison step 473. If the magnitude of the value from difference image $D_{i,j}$ 472 does not exceed the threshold value T then, in a step 474, conditioned output image data 20 is simply assigned the value of filtered image 465. On the other hand when the magnitude of difference image value $D_{i,j}$ 472 exceeds the threshold value T in step 473, a new difference value is computed in a computation step 475 by clipping the magnitude of the difference value $D_{i,j}$ to threshold value T, creating a modified difference image value $D'_{i,j}$ in a difference image value step 476. In step 476, the modified difference image value is then used to compute a conditioned output image 20 value.

Figure 17:
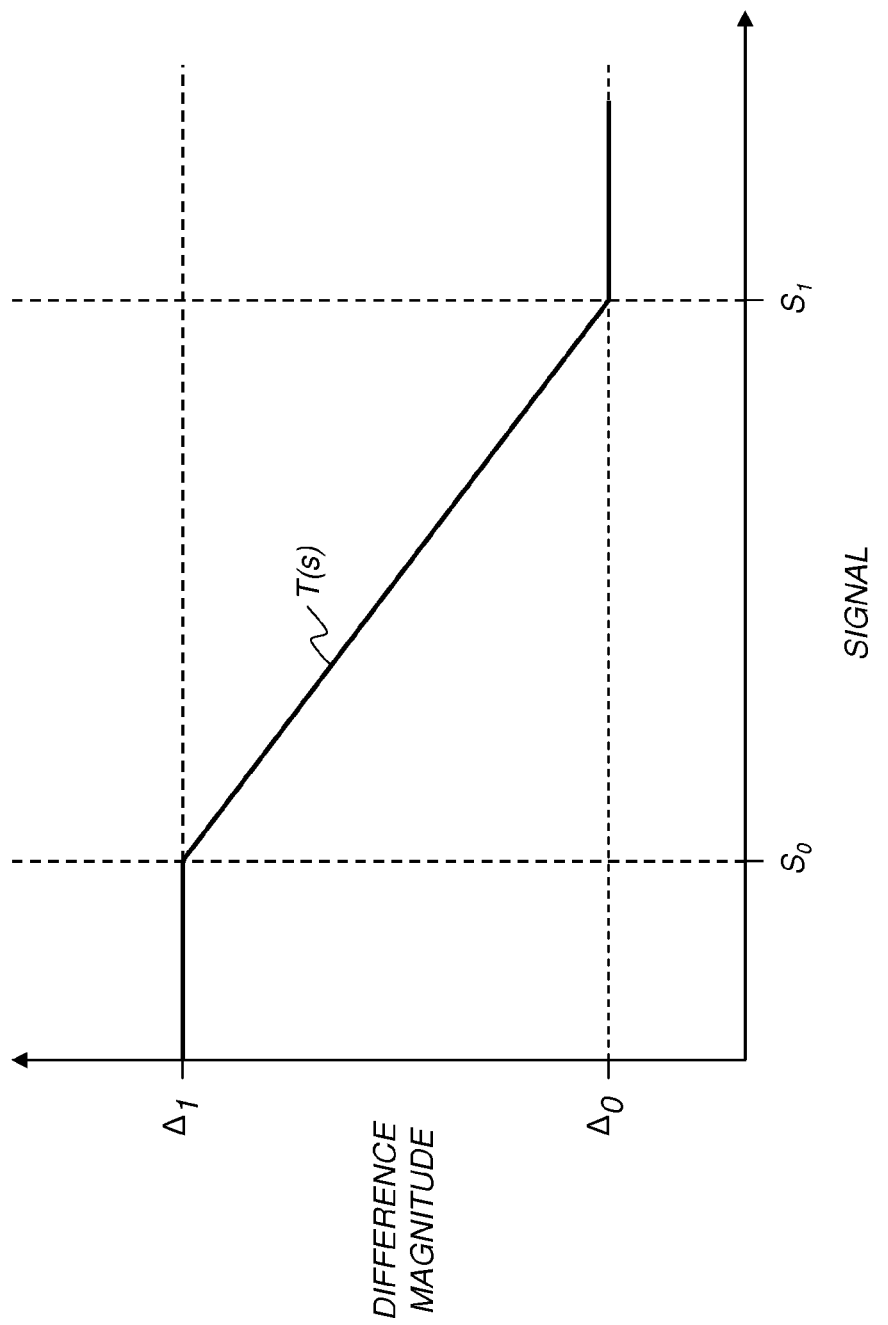
FIG. 17 is a graph showing a signal-threshold profile used when applying constraints.

The overall purpose of step 470 is to constrain the values of output image data 20 so that it does not differ from the values in original image data 10 by more than a pre-determined number of units. In a preferred embodiment, the threshold values T used for imposing the constraints to form the conditioned output image 20 are signal dependent, that is $T=T_{i,j}=T(s_{i,j})$ where $s_{i,j}$ is the input image signal at pixel location i,j. The reason for imposing signal dependency is to allow the threshold constraints to vary with signal to noise ratio. For EMI-induced noise, the noise is independent from the image signal and therefore the signal to noise ratio increases directly with the signal. Consequently, for optimal noise suppression, the threshold to signal relationship should qualitatively obey an association that is monotonic and non-increasing. One such realization of this threshold-to-signal relationship is shown in FIG. 17, where the signal is represented by exposure. This relationship, a piecewise linear function, is defined by four parameters:

$\Delta_0$ minimum threshold value
$\Delta_1$ maximum threshold value
$s_0$ beginning of threshold transition region
$s_1$ end of threshold transition region Qualitatively, this signal-threshold profile fixes the threshold at a maximum level $\Delta_1$ at lower signal levels $s<s_0$; this fixes the threshold at a minimum level $\Delta_0$ at higher signal levels, $s>s_1$; and transitions linearly from the maximum threshold level $\Delta_1$ to the minimum threshold level $\Delta_0$ over mid-signal transition region $s_0<s<s_1$.

The logic processing sequence of artifact suppression, as described herein, executes on one or more control logic processors, such as a computer, workstation, or dedicated processor, for example. The processor works in conjunction with one or more storage media, such as magnetic storage media such as magnetic disk or magnetic tape; optical storage media such as optical disk, optical tape, or machine readable bar code; solid-state electronic storage devices such as random access memory (RAM), or read-only memory (ROM); or any other physical device or media employed to store a logic program having instructions for controlling one or more processors.

The invention has been described in detail with particular reference to a presently preferred embodiment, but it will be understood that variations and modifications can be effected within the spirit and scope of the invention. For example, the method of the present invention can be used for EMI-related noise as well as for noise from some other source. Particular frequency ranges and the number of frequency bands that are manipulated can be changed according to the needs of a particular device and its environment. Various types of functions could be used as alternatives to FFT for obtaining frequency data.

The presently disclosed embodiments are therefore considered in all respects to be illustrative and not restrictive. The scope of the invention is indicated by the appended claims, and all changes that come within the meaning and range of equivalents thereof are intended to be embraced therein.

PARTS LIST

10. Input image data
12. Scintillator screen
20. Conditioned output image data
22. Photosensor
24. Pixel
25. Readout elements
26. Switch element
30. DR panel
32. Flat-panel detector
90. Test step
200. Noise detection process
220. Direction determination step
222. Step
224. Step
226. Computation step
228. Computation step
229. Test step
230. Step
235. Detrending step
240. Frequency transform step
250. Logarithmic conversion step
260. Filter step
270. Subtraction step
280. Accumulation step
290. Test step
295. Computation Step
400. Step
410. Decomposition step
411. Step
412. Row-blurred image
413. Subtraction step
415. Image
417. Step
420. Image
421. Filter step
422. Image
423, 424. Step
425. Coarse y-edge image
430. Column blurred image
440. Adaptive noise reduction step
441,443. Step
442, 444. Sub-band
460. Summation step
465. Filtered image
470. Step
471. Subtraction step
472. Difference image
473. Comparison step
474. Computation step
475. Step
476. Difference image value step
600. Noise suppression process
602. Threshold application step
604. Frequency determination step
606. Selection step
α. Vector
β. Noise frequency vector

The invention claimed is:

1. A method of reducing artifacts in a digital radiographic image comprising:
    identifying either a row or column direction for the artifacts in the image data as a predominant direction;
    obtaining a measurement of the image data frequency content that is subject to the artifacts from the image content according to the predominant direction;
    testing the measurement of image data frequency content subject to the artifacts according to a predetermined threshold; and
    reducing the artifacts when the predetermined threshold is exceeded by:
    generating one or more suppression factors according to the testing results;
    decomposing the image content into at least two frequency bands in each row and column direction;
    applying the one or more suppression factors to modify at least one of the frequency bands; and
    recomposing the image content by recombining the at least one modified frequency band with one or more other bands into which the image had been decomposed.

2. The method of claim 1 wherein identifying a predominant row or column direction comprises comparing statistical values obtained from row and column image data values.

3. The method of claim 1 wherein obtaining a measurement of the image data frequency content that is subject to the artifacts from the image content comprises conditioning the image data by obtaining the square root of each image data value.

4. The method of claim 1 wherein obtaining a measurement of the image data frequency content subject to the artifacts from the image content comprises performing a functional fit detrending process.

5. The method of claim 4 wherein the detrending process is linear.

6. The method of claim 1 wherein obtaining a measurement of the image data frequency content subject to the artifacts from the image content comprises applying a frequency transform.

7. The method of claim 6 further comprising obtaining logarithm values for the transformed data.

8. The method of claim 1 wherein the predominant row or column direction for the artifacts is predetermined.

9. The method of claim 1 wherein decomposing the image content further comprises:
    obtaining a first filtered image having low frequency content in a direction orthogonal to the predominant direction;
    filtering the first filtered image in the predominant direction and obtaining a second filtered image having low frequency content in the predominant direction;
    filtering the second filtered image having low frequency content in the predominant direction and generating a third filtered image;
    subtracting the second filtered image from the first filtered image to obtain a fine predominant direction edge image;
    subtracting the third filtered image from the second filtered image to obtain a coarse predominant direction edge image; and
    subtracting the first filtered image in the predominant direction from the original image to obtain an edge image in the direction orthogonal to the predominant direction.

10. The method of claim 9 wherein applying one or more suppression factors comprises:
    applying a first scaling factor to the fine predominant direction edge image to obtain a scaled fine predominant direction edge image; and
    applying a second scaling factor to the coarse predominant direction edge image to obtain a scaled coarse predominant direction edge image.

11. The method of claim 1 wherein decomposing the image content comprises defining the at least two frequency bands according to results from obtaining a measurement of the image data frequency content.

12. The method of claim 1 further comprising applying one or more constraints to the recomposed image content.

13. The method of claim 12 wherein applying one or more constraints further comprises determining the difference between the recomposed image content and the original input image content.

14. The method of claim 1 wherein reducing the artifacts comprises applying the one or more suppression factors to a frequency band in the predominant direction.

15. The method of claim 1 wherein decomposing the image content into at least two frequency bands comprises identifying one or more filter values according to the image data.

* * * * *